Figure 1:
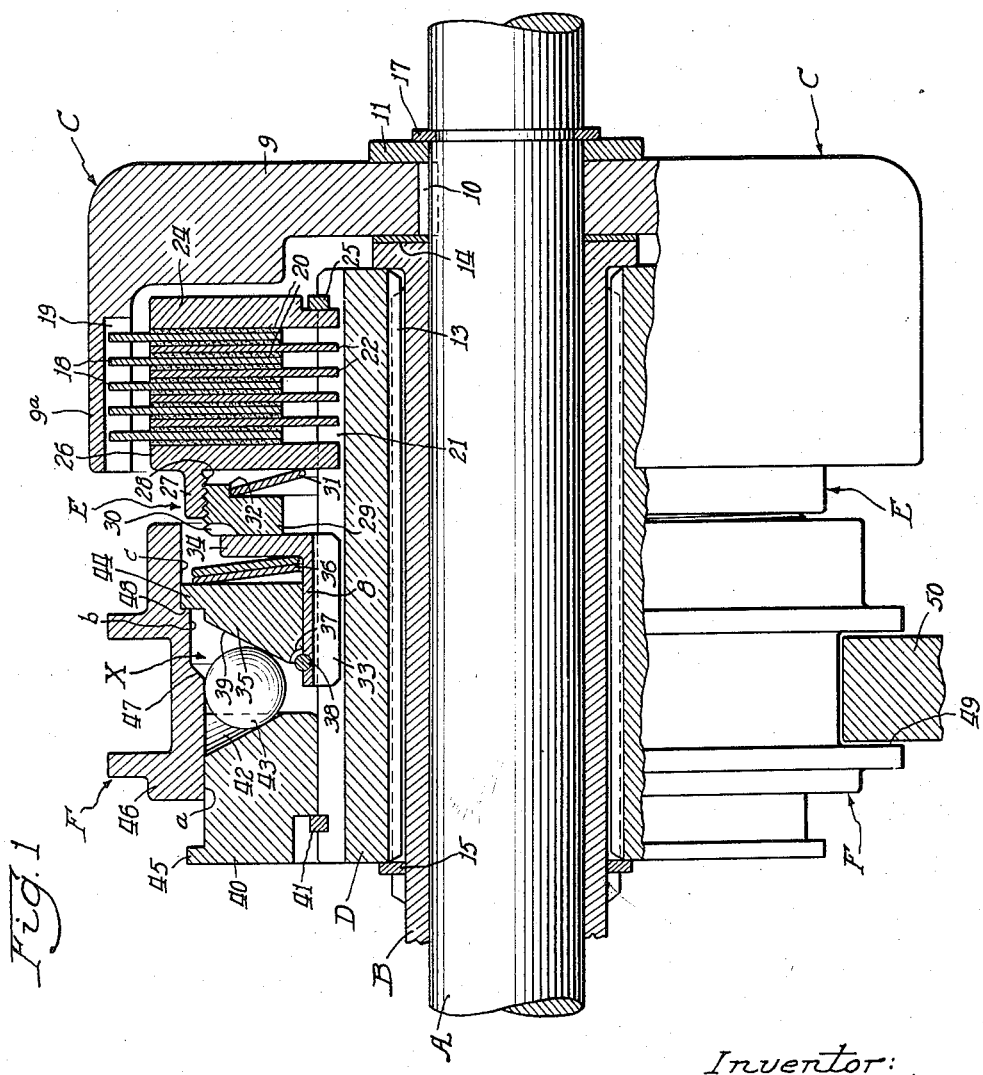

Oct. 14, 1958  R. A. CARLSON  2,856,048
CAM OPERATED CLUTCH AND ADJUSTING MEANS
Filed Dec. 8, 1953  2 Sheets-Sheet 2

Inventor:
Raymond A. Carlson
By: E. R. Lundy
Atty.

United States Patent Office 2,856,048
Patented Oct. 14, 1958

2,856,048

CAM OPERATED CLUTCH AND ADJUSTING MEANS

Raymond A. Carlson, Rockford, Ill., assignor to Borg-Warner Corporation, Chicago, Ill., a corporation of Illinois Application December 8, 1953, Serial No. 396,929

12 Claims. (Cl. 192—93)

The present invention relates to improved means for effectively connecting drive and driven shafts, said means comprising a clutch assembly wherein a novel arrangement is provided for alternately engaging and disengaging said clutch assembly.

Briefly stated, in the present structure, the clutch assembly is preferably of the multiple disc type, and the means for effecting a gripping action between the discs comprises a shiftable pressure plate which is tensioned against one of a pair of spaced annular or ring-like members having an outwardly diverging channel or V-shaped space between them. A radially inwardly directed wedging force is created in said channel to move at least one of said annular members axially away from the other member. This force is exerted by means of spherical bodies or metal balls which are seated in the V-shaped channel and are adapted to be moved inward by means of a cam element on the inner surface of a shift collar that is movable axially on the annular members. As seen in the drawings the shift collar is arranged to slide directly on said annular members.

In the herein disclosed clutch assembly, the driving clutch member may be in the form of a cylinder carried by and splined to a hollow or sleeve type drive shaft that surrounds the driven shaft, and the clutch driven members include a radial body having an annular internally splined flange with which a first group or series of discs are engaged. The aforesaid flange also encloses a second or alternate group of discs which are splined to the cylindrical driven clutch member.

As clearly shown in the drawings, the whole assembly comprising the shafts, the pressure plate assembly, the actuator assembly, and all of the clutch driving and driven members, including the friction discs, are of annular shape and are concentric to the axis of the driven shaft that performs the function of a supporting member for all of the parts.

A feature of the present improvements resides in an assembly for forcing the pressure plate into a clutch engaged position, such assembly comprising an annular member slidable axially on the cylindrical driving clutch member and supporting a ring having a limited sliding movement thereon and being engaged against Belleville spring means between said ring and a radial stop or flange on said annular member close to the pressure plate assembly.

Another feature of the present improvements comprises the provision of an annulus on the driving clutch member alongside the above-mentioned sliding annular member and having concave seats in its radial side face to hold the spherical bodies which coact with an inclined confronting face of the limited movement ring thereby to energize the pressure plate actuator means when the spherical bodies are being forced radially inward by the cam element on the shift collar.

It will be apparent from the within disclosures, that the preferred embodiment of this clutch assembly is readily capable of installation in a dual clutch assembly to provide selective alternate, two-speed gear ratio for imparting torque to a duo-directional or reversible power transmitting shaft. This arrangement is also shown in the accompanying drawings.

Additional objects, aims and advantages of the invention contemplated herein will be apparent to persons skilled in the art after the construction and operation of the present clutch arrangement is understood from the following description. It is preferred to accomplish the numerous objects of this invention and to practice the same in substantially the manner hereinafter fully described and as more particularly pointed out in the appended claims, reference being made to the accompanying drawings that form a part of this specification.

Figure 2:
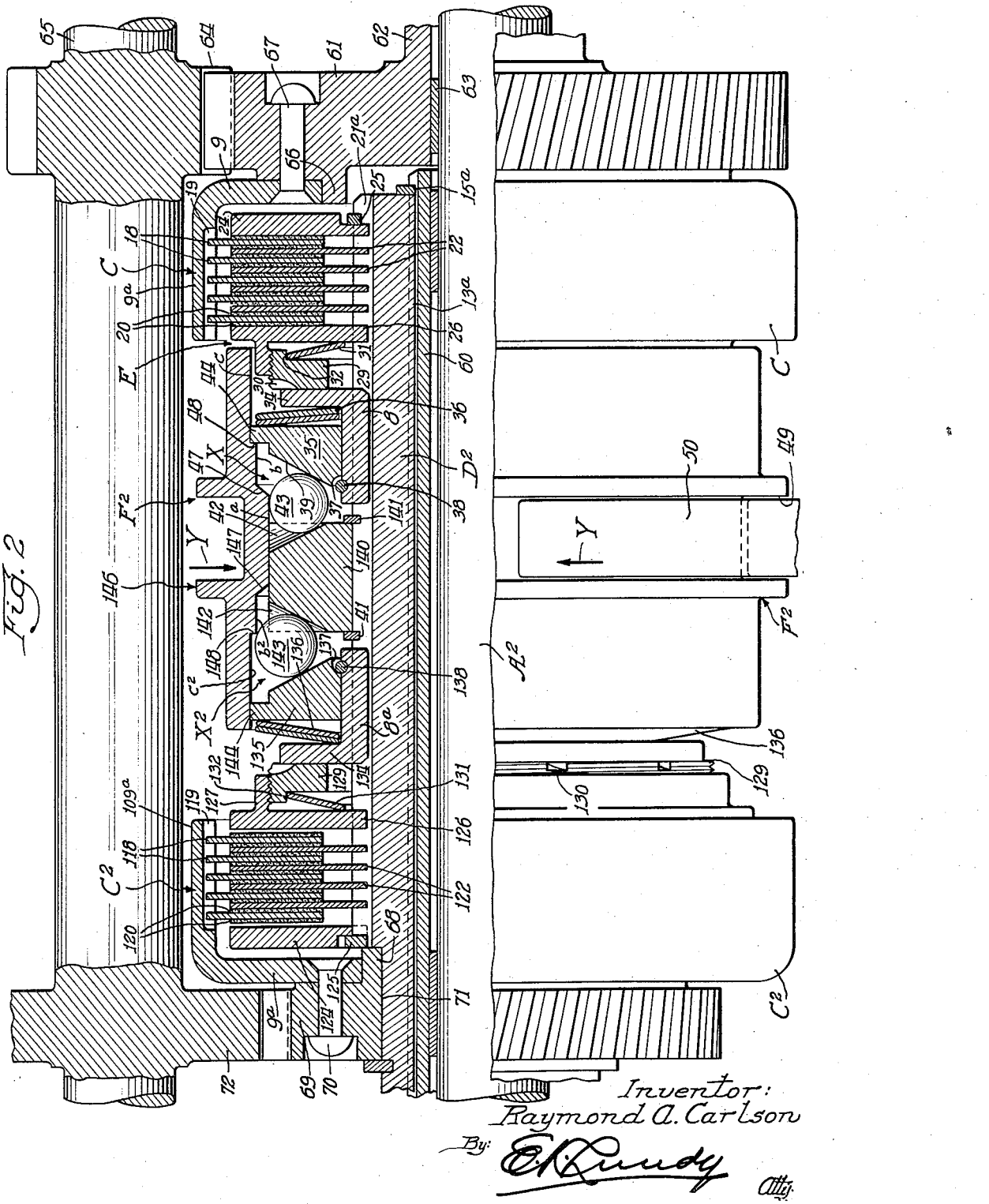

In the drawings:

Fig. 1 is an elevation, partly in longitudinal axial section, showing a preferred embodiment of the structure contemplated herein; and, Fig. 2 is a view similar to Fig. 1 and disclosing the preferred embodiment incorporated in a dual or two-speed gear ratio arrangement.

The drawings are to be understood as being more or less of a diagrammatic character for the purpose of disclosing typical or preferred forms of the invention contemplated herein, and in these drawings like reference characters are used to identify the same parts in the different views.

Briefly stated, the arrangement contemplated herein comprises generally a centrally arranged driven shaft A that is surrounded by a drive shaft B of the sleeve-type, and a driven clutch assembly C is connected to the driven shaft A alongside, or at the end of, said sleeve shaft. A cylindrical or tubular driving clutch member D, surrounding the sleeve drive shaft B, is rotated by its splined connection said sleeve shaft and it is adapted to support the pressure plate assembly E as well as the driving group of clutch discs, and the group of driven clutch discs is operatively associated with a rotatable member of the driven clutch assembly C. Operation of this clutch arrangement is effectively accomplished by means of an actuator assembly F wherein a suitable wedging arrangement is urged radially inwardly in a V-shaped channel X located between and defined by confronting faces an annular stop and an axially shiftable ring having a chamfered face spaced therefrom for generating a yieldable axial force against the pressure plate assembly E to pack the two groups of friction discs together between a pressure plate member of the assembly E and a radial back plate on the driving clutch member D or secured to any other convenient element of the clutch arrangement.

Referring now to Fig. 1, the clutch supporting element may be represented by the driven shaft A upon which the sleeve drive shaft B is mounted for independent rotation thereon. The clutch driven assembly has a radially extending annular body or wall 9 arranged beyond the adjacent end of said sleeve shaft B where said element 9 has driving connection with the driven shaft A by means of the key 10 that is held in position by a lock washer 11 and a snap ring 12. The cylindrical driving clutch member D surrounds sleeve drive shaft B and is splined thereto as at 13 so that it rotates with said sleeve shaft. A spacer 14 holds the right hand end of driving clutch member D in spaced relation to the inner end face of the driven clutch element 9 of the assembly C, while at the opposite end of said driving clutch member there is a snap ring 15 interposed between said end of member D and an annular abutment portion of the sleeve drive shaft B. This arrangement maintains said driving clutch member D against longitudinal axial movement with respect to said sleeve shaft and permits synchronous rotation of these elements.

The driven clutch assembly C comprises the radial body portion 9, above mentioned, that has an annular flange or rim 9a extending axially in radially spaced relation to and surrounding the adjacent end region of said cylindrical driving clutch member D and houses the friction members. The group of driven friction discs 18 are splined as at 19 to the inner surface of the rim flange 9a and, as seen, these driven discs preferably have friction facings 20 suitably secured to opposite surfaces thereof.

The driving clutch member D has exterior splines as at 21 to receive the inner peripheral portions of the group of driving friction discs 22 which are alternately arranged with respect to the driven discs 18, so that each driving disc 22 will contact the friction facings 20 on adjacent discs 18 when the clutch assembly has been engaged. An annular back plate 24 is splined to the driving clutch member D, and a snap ring 25 provides a stop or abutment to prevent movement of the back plate 24 toward the right hand end of the assembly C.

The pressure plate assembly E comprises a radial plate 26 carried by the splines 21 of the driving clutch member D with its right end confronting the groups of discs heretofore mentioned. An axially extending flange 27 on plate 26 is internally threaded as at 28 to receive the external threads on an annulus 29 that is screwed into the flange 27. There are several notches 30 in an exposed portion of this annulus 29 to permit it to be rotated by a suitable tool to effect an adjustment of the tension of a Belleville type spring washer 31. This spring washer has its inner peripheral portion in contact with the adjacent surface of the pressure plate 26, while the outer peripery of said spring washer is engaged under a shoulder 32 on the adjacent radial face of the annulus 29. The purpose of the Belleville spring 31 is to provide a spring lock which is adapted to prevent unintentional rotation of the threaded members 27 and 29 with respect to each other, and said washer also is effective to alter the position of annulus 29 with respect to an adjacent member of the actuator assembly F, whereby take-up adjustment may be made to accommodate wear which may take place on the discs 18 and 22. This is effected by using negative rate type Belleville washers.

The means for axially shifting the pressure plate 26 to engage and release the clutch members comprises the actuator assembly F which includes the tubular hub-like ring 8, the inner periphery of which has splines 33 coacting with the splines 21 on the driving clutch member D, and said ring has an upstanding flange 34 lying in contact with the adjacent surface of the adjusting annulus 29 carried by the pressure plate 26. The outer cylindrical surface of ring 8 slidably carries a shift member 35 which normally is urged in an axial direction away from flange 34 by Belleville washer type spring means 36. Movement of shift member 35 to the left, or away from pressure plate assembly E, is limited by a stop 38 seated in the end region of tubular ring 8 and is adapted to be engaged in an annular recess 37 of arcuate cross-section in the inner corner of said shift member. Extending radially outward from the groove 37 this shift member has an inclined or chamfered surface 39 which lies in a plane oblique to a plane perpendicular to the axis of the assembly. Spaced to the left on the shift member 35 there is an annulus 40 which is supported for sliding movement on the cylindrical driving clutch member D as shown. Annulus 40 is limited as to the extent of its axial sliding movement by a stop 41 near the end of the driving clutch member D, and said annulus has semiconical or tapered pockets 42 in which spherical bodies in the form of steel balls 43 are seated. These pockets 42, together with the inclined or chamfered face 39 of the shift member 35, define a substantially V-shaped annular channel X which diverges in a radially outward direction between the shift member 35 and the annulus 40. The ring-like elements 35 and 40 have radially outward extending flanges which define stops or abutments 44 and 45, respectively, for limiting the longitudinal movement of the annular shift collar 46, one end edge of which is adapted to contact stop 45 when shift collar 46 is moved toward the left to release the pressure plate 26 and disengage the clutch, and the other end edge of the shift collar will contact the stop flange 44 when the collar moves to the right when effecting engagement of the clutch. The inner surface of shift collar has longitudinally stepped annular sections, a, b and c, the left section a being slidable on the outer surface of annulus 40, and the right section c being slidable on the outer face of stop 44. The intermediate section b is characterized by a face cam portion 47 coacting with the balls 43 and there is a shoulder 48 that contacts stop 44 on the shift member 35 to limit movement of the collar 46 to the right. The outer surface of shift collar 46 is provided with an annular groove 49 to receive the arms of an actuator yoke 50.

In operation, as will be seen in Fig. 1, the shift collar is in a position wherein the face cam 47 has engaged and forced a steel ball 43 radially inward by reason of the wedging engagement of the ball against the walls of the V-shaped channel which is defined by the chamfered or oblique surface 39 and the semi-conical pockets 42. This wedging operation has forced the shift member 35 axially to the right, tending to compress the Belleville spring 36 against the flange 34 which in turn has forced the pressure plate assembly E into firm contact with the two groups of clutch discs 18 and 22 thus packing these discs together against the back plate 24 thus effecting clutch engagement. As a result, the sleeve drive shaft B has transmitted its rotative movement to the driving clutch member D and, through the splined connections of the discs 18 and 22, torque is transmitted to the driving clutch assembly C which in turn rotates the driven shaft A through its keyed connection 10 between said driven shaft A and the radial body portion 9 of the driven clutch assembly C. When the shift collar 46 is moved toward the left until its right hand end contacts abutment 45, the cam 47 has moved out of contact with the balls which are then adjacent the central annular surface section b due to outward movement of the balls 43 in the V-shaped channel in response to the urge of the Belleville spring means 36 which will force the shift member 35 to the left, thereby relieving the packing pressure against the groups of clutch discs 18–22 and releasing or disengaging the clutch.

The structure shown in Fig. 2 comprises a double clutch arrangement which is incorporated in a selective two-speed gear ratio for imparting torque to a duo-directional power transmission shaft. In this arrangement, the clutch assembly shown at the right of the heavy arrows "Y" is generally identical with the single clutch hereinbefore described in connection with Fig. 1 and the parts thereof for simplicity, have been identified by the same reference characters as the corresponding members of Fig. 1. In the second clutch assembly, which appears at the left of the central heavy-lined arrows "Y," the clutch parts are arranged in reverse order away from the center of the complete assembly. For the purpose of identifying the clutch elements, the reference letters in this left hand portion have been identified by adding the exponent "2," and the numerals have been increased by one hundred. However, it should be here stated that annulus 140 is centrally arranged intermediate the two clutch assemblies so that it is common to both, and said annulus is fixed against longitudinal movement between snap rings 41 and 141. The left end face of common annulus 140 has semi-conical or tapered recesses 142 which receive the spherical bodies or metal balls 143 that are to be engaged by the additional face cam 147 on the inner circumferential surface of the single or common shift collar 146 that is arranged to slide on the upstanding end portions 44 and 144 of the shift members 35 and 135, and is also supported on the cylindrical outer surface of the central or common annulus 140. The additional face cam 147 is arranged to act on the balls 143 and the shoulder 148 is adapted to contact upstanding portion 144 to limit movement of shift collar to the left.

The clutch members lying to the left in Fig. 2 have been shown in clutch released positions, while the members of the second clutch, lying to the right of common annulus 140, are in clutch engaged positions. This is due to the fact that the face cam 47 on the shift collar 46 has forced balls 33 radially inward in the V-shaped channel X which is bounded by the pockets 42 and the inclined or chamfered end face 39 of actuator member 35. Further, it will be noted that the second shift collar face cam 147 has been positioned where it is out of operative contact with the balls 143 in the V-shaped channel X2 at the left side of the common annulus 140, thus permitting the left clutch assembly to be relieved of pressure and is inoperative to transmit torque. Should the shift collar be moved to and remain in a neutral or central position with respect to the annulus 140, both clutches are then released. It is apparent that movement of the shift collar to its limit in one direction or the other will cause the engagement of the clutch which is located on the side of the common central annulus 140 towards which the shift collar has been moved.

In the arrangement shown in Fig. 2, the solid shaft A², which provides support for the dual clutches, carries an elongate tubular bearing 60 on which the cylinder driving clutch member D² is splined as at 13a, said member D² being held against longitudinal movement by snap rings 15a which are engaged with its ends, and there are longitudinal splines 21a on the outer cylindrical surface of driving clutch member D² for performing the functions hereinbefore ascribed to it. A gear 61 on a hollow driven shaft 62 is journaled on shaft A² as at 63 in spaced relation to the adjacent end of the tubular bearing 60. This gear 61 meshes with a drive pinion 64 arranged on the driving gear shaft 65 which later derives its rotative movement from any suitable prime movement such as the crank-shaft of the motor in an automotive vehicle. This driving gear shaft 65 is arranged with its axis in parallelism with shaft A² and it is alongside and radially spaced beyond the two clutch assemblies C and C². The radially extending end wall 9 of the right hand clutch assembly C rests on an annular shoulder or flange 66 projecting axially from the side of said gear and said wall is attached to the gear by a bolt or rivet means 67.

At the other or left hand end region of the Fig. 2 arrangement, the radially extending end wall 9a of the second clutch assembly C² is carried on the annular shoulder or hub-like portion 68 of a pinion 69 and it is bolted or riveted to the latter as at 70. As seen in the drawings, the pinion 69 is mounted in an annular channel 71 in the outer surface of the cylinder driving member D² whereby it is adapted for rotative movement independently of the member D². Pinion 69 is meshed with a gear 72 carried on the adjacent region of the drive shaft 65.

It is to be here noted that the ratio between gear 72 and its meshed pinion 69, which are at one end of the arrangement, differs from the ratio between the pinion 64 and its meshed gear 61 at the right-hand end of the arrangement. In operation, as shown in Fig. 2, the right-hand clutch assembly C is in its engaged position and the left-hand clutch C² is disengaged or idle. Thus, the torgue is transmitted from the driving shaft 65 through the meshed gear and pinion, 64 and 61 respectively, to the active clutch C which thereby rotates the tubular member D². When the condition of the clutches has been reversed, as by moving the shift collar 146 to the left, the clutch assembly C will become idle and the second clutch assembly C² will be engaged. Under these conditions, torque at a different speed ratio will be effected to rotate the cylindrical member D². Thus the torque is transmitted from gear 72 to pinion 69, and through the engaged left hand clutch C² to the member D². It is apparent that not only do the clutches C and C² transmit torque to the driven member D² but torque also is transmitted to said driven member through the clutch actuator devices which include ring-like members 8 or 8a that are splined to the driven member D² and rotate synchronously with the respective clutches.

Also it should be noted that the Belleville springs or washers 31, 36, 131, and 136, shown in Figs. 1 and 2 of the drawings of this particular clutch mechanism, are of the negative rate type. The characteristics of these washers are such that, as the friction material 20 and 120 wears, there is an increase in the pressure which is expended upon the friction clutch disc, rather than a decrease.

While this invention has been described in detail in its present perferred form or embodiments, it will be apparent to persons skilled in the art, after understanding construction, operation and function of the improvements, that various changes and modifications may be made therein without departing from the spirit or scope thereof. It is aimed in the appended claims to cover all such changes and modifications.

What is claimed is:

1. A clutch assembly comprising a rotatable driving clutch member, and a driven clutch member rotated thereby; a plurality of friction discs splined in alternate order to said members for transmitting torque therebetween; a back plate arranged in a normally fixed position on said driving member; a pressure plate splined to and movable axially on said driving member to pack said discs against said back plate; adjusting means movably mounted on said pressure plate; an axially movable ring splined to said driving member for moving said pressure plate towards said back plate; an annulus having limited slidable movement axially on said ring; spring means urging said ring and annulus in opposite directions on said driving member; an annular abutment member having a normally fixed position on said driving member in spaced relation to said annulus; said annulus and abutment member having facing cam surfaces; wedging elements engaging said cam surfaces; and a shift collar surrounding said annulus and abutment and having an internal shoulder which is effective upon axial movement of said collar in one direction to engage and move said wedging elements radially inward against said cam surfaces and thereby urge said pressure plate in an axial direction for packing said discs against said back plate.

2. A torque transmitting assembly comprising a driven shaft; a driving sleeve shaft rotatable thereon; a driving clutch member secured to and rotated by said sleeve shaft; a driven clutch member carried by and rotatable with said driven shaft; a plurality of friction discs splined in alternate order to said clutch members and operable for transmitting torque therebetween; a back plate mounted on and rotated by said driving clutch member; an axially movable pressure plate splined to and rotatable with said driving clutch member; a rotatable adjusting member threaded on said pressure plate; an axially movable ring splined to said driving clutch member for packing said pressure plate against said discs; an annulus having limited slidable movement axially on said ring; Belleville spring washer means having a negative rate urging said ring and annulus away from each other on said driving member; an annular abutment member on said driving clutch member alongside said annulus; said annulus and abutment member having facing cam surfaces; antifriction balls engaging said cam surfaces; and a shift collar slidably mounted on said annulus and abutment and having an internal cam member engageable with said balls; whereby, upon axial movement of said collar the cam member thereon will move said balls radially inward against the cam surfaces of said abutment and annulus in opposition to said spring washer means and thereby move said pressure plate in an axial direction for packing said discs against said back plate.

3. A clutch assembly comprising a driving clutch member, and a driven clutch member actuated thereby; a plurality of friction discs splined in alternate order to said members and operable for transmitting torque therebetween; a back plate arranged in a normally fixed position on said driving member and against which said discs are packed during clutch engagement; a pressure plate movable axially on said driving member; an axially movable ring splined to said driving member; a radial flange on said ring adjacent said pressure plate; an annular adjusting member threaded to said pressure plate and engaged by said flange; an annulus slidable axially on said ring; Belleville spring means having a negative rate between said flange and annulus; abutment means on said driving member in spaced relation to said annulus; said annulus and abutment member having facing cam surfaces; antifrictional balls engaging said cam surfaces; and a shift collar slidably mounted on said annulus and abutment and having an internal cam member engageable with said balls; whereby, upon axial movement of said shift collar the cam member thereon will move said balls radially inward against the cam surfaces of said abutment and annulus in opposition to said Belleville spring means and thereby move said pressure plate axially in a direction to pack said discs against said back plate.

4. A clutch assembly comprising clutch driving and driven members rotatable about a common axis; said driving member being defined by a cylinder rotatable with a power shaft; annular discs splined in alternate order respectively to said cylinder and driven member; means including a pressure element operable to pack said discs together for transmitting torque from one member to the other; and devices for actuating said packing means comprising an annulus splined to said clutch cylinder for axial movement thereon, said annulus having a radial flange cooperatively associated with said pressure element of said disc packing means; a cam ring reciprocably mounted on the body of said annulus; yieldable means acting against said ring and said annulus flange; a stop ring mounted on said clutch cylinder and having tapered notches confronting the cam surface of said cam ring; wedge elements seated in said notches and contacting the cam surface of said cam ring; an axially movable shift collar adjacent said rings; and cam means on said shift collar for engagement with said wedge elements to force said elements radially inwardly and thereby move said cam ring toward said annulus flange for engaging the clutch.

5. A clutch assembly comprising clutch driving and driven members rotatable about a common axis; said driving member being defined by a cylinder rotatable on a power shaft; annular discs splined in alternate order respectively to said cylinder and driven member; means including a pressure element operable to pack said discs together for transmitting torque from one member to the other; and devices for actuating said packing means comprising an annulus splined to said clutch cylinder for axial movement thereon, said annulus having a radial flange cooperatively associated with said pressure element of said disc packing means; a cam ring reciprocably mounted on the body of said annulus; a Belleville spring washer effective to urge said ring away from said annulus flange for releasing the clutch; a ring mounted on said clutch cylinder and having tapered notches confronting the cam surface of said cam ring; wedge elements seated in said notches and contacting the cam surface of said cam ring; an axially movable shift collar cooperatively associated with rings; and cam means on said shift collar and opposing the thrust of said Belleville spring washer for engagement with said wedge elements to force said elements radially inwardly and thereby move said cam ring toward said annulus flange for engaging the clutch.

6. A clutch assembly comprising clutch driving and driven members rotatable about a common axis; said driving member being defined by a cylinder rotatable with a power shaft; annular discs splined in alternate order respectively to said cylinder and driven member; means including a pressure element operable to pack said discs together for transmitting torque from one member to the other; and devices for actuating said packing means comprising an annulus splined to said clutch cylinder for axial movement thereon, said annulus having a radial flange cooperatively associated with said pressure element of said disc packing means; a cam ring reciprocably mounted on the body of said annulus; a Belleville spring washer acting on said ring and annulus flange for releasing the clutch; a ring mounted on said clutch cylinder and having tapered notches confronting the cam surface of said cam ring; balls seated in said notches in contact with the cam surface of said cam ring; a shift collar slidable in an axial direction on the radially outer regions of said rings; an annular cam boss on the inner region of said shift collar and opposing the thrust of said Belleville spring washer for engagement with said wedge elements to force said elements radially inwardly and thereby move said cam ring toward said annulus flange for engaging the clutch; and means for adjusting the tension of said Belleville spring washer.

7. A torque transmission assembly comprising coaxial drive and driven shafts; a clutch driving member on said drive shaft; a clutch driven member on said driven shaft; friction discs connected in alternate order to said members and adapted to be packed together for transmitting torque between said shafts; a pressure plate operable to pack said friction discs together; an axially adjustable annulus carried by said pressure plate; an annular member slidable on said drive shaft and having radial means contacting said adjustable annulus; a pair of rings having spaced end faces defining between them a channel having a V-section; means fixing one ring on said drive shaft; means permitting axial movement of the other ring on said drive shaft to transmit packing pressure to said friction discs; a shift collar slidable axially on said rings; a plurality of bearing balls arranged in said channel, said shift collar having cam means operable against said bearing balls to force the latter inwardly in said V-shaped channel thereby to exert a wedging action between the end faces of said rings to spread said rings axially and effect clutch engagement; and Belleville spring means yieldably acting upon said movable ring and said radial means and exerting pressure on said friction discs tending to oppose the wedging action of said bearing balls.

8. A clutch assembly comprising a pair of axially spaced driving clutch members; a driven clutch member for each driving clutch member; an input shaft geared to and operable to rotate said driving clutch members; a sleeve shaft extending between said driven clutch members; a pair of shiftable pressure plates splined to said sleeve shaft adjacent the respective driving clutch members; abutment plates on said sleeve shaft each spaced from a respective pressure plate; two sets of friction members in the respective spaces between said pressure plates and abutment plates, said members splined in alternate order respectively to said sleeve shaft and the adjacent driving clutch member; spaced rings on said sleeve shaft supported by said sleeve shaft and having oppositely defined conical end surfaces; L-shaped annuli between the pressure plates and spaced rings, each annulus being defined by a cylindrical body portion with a radial flange, said flange acting against the adjacent pressure plate and the cylindrical body portion being splined to the sleeve shaft and supporting an adjacent ring; a common stop element fixed to said sleeve shaft between said rings, said stop element having tapered radial regions on opposite end surfaces defining with the conical end surfaces of said rings V-shaped channels; a set of radially movable wedging elements seated in each channel and alternately operable against the conical surface of the adjacent ring thereby to impart axial movement to said adjacent ring to actuate the adjacent pressure plate and thereby effect engagement of the respective clutch; and common means for separately actuating said wedging elements.

9. A clutch assembly comprising a pair of axially spaced driving clutch members; a driven clutch member for each driving clutch member; an input shaft geared to and operable to rotate said driving clutch members; a sleeve shaft extending between said driven clutch members; a pair of shiftable pressure plates splined to said sleeve shaft adjacent the respective driving clutch members; abutment plates on said sleeve shaft each spaced from a respective pressure plate; two sets of friction members in the respective spaces between said pressure plates and abutment plates, said members splined in alternate order respectively to said sleeve shaft and the adjacent driving clutch member; spaced rings on said sleeve shaft supported by said sleeve shaft and having oppositely defined conical end surfaces; L-shaped annuli between the pressure plates and spaced rings, each annulus being defined by a cylindrical body portion with a radial flange, said flange acting against the adjacent pressure plate and the cylindrical body portion being splined to the sleeve shaft and supporting an adjacent ring; Belleville spring washer means acting between the respective rings and the flanges of said annuli in yielding opposition to the clutch engaging thrust exerted by a set of wedging elements against a ring; a common stop element fixed to said sleeve shaft between said rings, said stop element having tapered radial regions on opposite end surfaces defining with the conical end surfaces of said rings V-shaped channels; a set of radially movable wedging elements seated in each channel and alternately operable against the conical surface of the adjacent ring thereby to impart axial movement to said adjacent ring to actuate the adjacent pressure plate and thereby effect engagement of the respective clutch; and common means for separately actuating said wedging elements.

10. A clutch assembly comprising a clutch driving member, and a clutch driven member actuated thereby, one of said members comprising a sleeve shaft; a plurality of friction discs connected in alternate order to said members and operable for transmitting torque therebetween; a back plate arranged in a normally fixed position on said sleeve shaft and against which said discs are packed during clutch engagement; a pressure plate splined to and shiftable axially on said sleeve shaft; a ring on said sleeve shaft supported by said sleeve shaft and having a conical surface; an L-shaped annulus between said pressure plate and ring, said annulus being defined by a cylindrical body portion with a radial flange, said flange acting against said pressure plate and the cylindrical body portion being splined to the sleeve shaft and supporting said ring; a stop element fixed to said sleeve shaft adjacent said ring, said stop element having a tapered radial region having a surface defining with the conical surface of said ring a V-shaped channel; a set of radially movable wedging elements seated in said channel and operable against the conical surface of said ring to impart axial movement to said ring to actuate said pressure plate and thereby effect engagement of the clutch; and means for actuating said wedging elements.

11. A clutch assembly comprising a clutch driving member, and a clutch driven member actuated thereby, one of said members comprising a sleeve shaft; a plurality of friction discs connected in alternate order to said members and operable for transmitting torque therebetween; a back plate arranged in a normally fixed position on said sleeve shaft and against which said discs are packed during clutch engagement; a pressure plate splined to and shiftable axially on said sleeve shaft; a ring on said sleeve shaft supported by said sleeve shaft and having a conical surface; an L-shaped annulus between said pressure plate and ring, said annulus being defined by a cylindrical body portion with a radial flange, said flange acting against the pressure plate and the cylindrical body portion being splined to the sleeve shaft and supporting said ring; Belleville spring washer means acting between the ring and flange of said annulus in yielding opposition to the clutch engaging thrust exerted by said set of wedging elements against said ring; a stop element fixed to said sleeve shaft adjacent said ring, said stop element having a tapered radial region having a surface defining with the conical surface of said ring a V-shaped channel; a set of radially movable wedging elements seated in said channel and operable against the conical surface of said ring to impart axial movement to said ring to actuate said pressure plate and thereby effect engagement of the clutch; and means for actuating said wedging elements.

12. A clutch comprising a clutch driving member, and a clutch driven member actuated thereby; friction means operable to transmit torque between said clutch members; a pair of rings having spaced end faces defining between them a channel of V-section; means fixing one ring, and means permitting axial movement of the other ring to transmit packing pressure to said friction means; an axially movable shift collar; a plurality of bearing balls arranged in said channel, said shift collar having cam means engageable with said bearing balls to move them inwardly in said channel thereby to exert wedging action against the end faces of said rings to spread said rings axially and effect clutch engagement; and Belleville spring means having a negative rate yieldably action upon said movable ring and exerting pressure on said friction discs tending to oppose the wedging action of said bearing balls, said movable ring being axially spaced from the friction means; a pressure plate operable against said friction means; and means between said pressure plate and movable ring for adjusting the tension of said Belleville spring means.

References Cited in the file of this patent

UNITED STATES PATENTS

| | | |
|---|---|---|
| 1,768,116 | Chilton | June 24, 1940 |
| 2,244,169 | Miller | June 3, 1941 |
| 2,325,193 | Nutt et al. | July 27, 1943 |
| 2,397,414 | Fast | Mar. 26, 1946 |
| 2,407,060 | Croft | Sept. 3, 1946 |

FOREIGN PATENTS

| | | |
|---|---|---|
| 274,955 | Switzerland | July 16, 1951 |
| 515,913 | Belgium | Dec. 15, 1952 |
| 455,222 | Great Britain | Oct. 12, 1936 |
| 565,199 | Great Britain | Oct. 31, 1944 |